(12) United States Patent
Kuhlmann et al.

(10) Patent No.: US 10,119,854 B2
(45) Date of Patent: Nov. 6, 2018

(54) WEIGHING CHAMBER BASE AND DRAFT SHIELD FOR A PRECISION BALANCE AS WELL AS A PRECISION BALANCE

(71) Applicant: Sartorius Lab Instruments GmbH & Co. KG, Goettingen (DE)

(72) Inventors: Otto Kuhlmann, Goettingen (DE); Michael Laubstein, Goettingen (DE); Jan Von Steuben, Goettingen (DE)

(73) Assignee: SARTORIUS LAB INSTRUMENTS GMBH & CO. KG, Goettingen (DE)

( * ) Notice: Subject to any disclaimer, the term of this patent is extended or adjusted under 35 U.S.C. 154(b) by 208 days.

(21) Appl. No.: 15/164,245

(22) Filed: May 25, 2016

(65) Prior Publication Data
US 2016/0265963 A1 Sep. 15, 2016

Related U.S. Application Data

(63) Continuation of application No. PCT/EP2014/002814, filed on Oct. 18, 2014.

(30) Foreign Application Priority Data

Nov. 25, 2013 (DE) .................. 10 2013 113 003

(51) Int. Cl.
*G01G 21/28* (2006.01)
(52) U.S. Cl.
CPC .................. *G01G 21/286* (2013.01)
(58) Field of Classification Search
CPC .................. G01G 21/286; E05Y 2900/204
See application file for complete search history.

(56) References Cited

U.S. PATENT DOCUMENTS

| 4,664,207 A * | 5/1987 | Knothe ................ G01G 21/286 177/181 |
| 6,566,614 B1 | 5/2003 | Flueckiger et al. |
| 7,960,658 B2 * | 6/2011 | Mock .................. G01G 21/286 177/126 |
| 8,203,086 B2 * | 6/2012 | Izumo .................... G01G 21/30 177/180 |

(Continued)

FOREIGN PATENT DOCUMENTS

| DE | 19849399 A1 | 5/2000 |
| DE | 10355106 A1 | 6/2005 |

(Continued)

OTHER PUBLICATIONS

International Search Report in counterpart International Application No. PCT/EP2014/002814, dated Dec. 23, 2014.

*Primary Examiner* — Randy Gibson
(74) *Attorney, Agent, or Firm* — Edell, Shapiro & Finnan, LLC

(57) ABSTRACT

A weighing chamber base (34) for a precision balance (10) has a weighing base section (98) and two side cheeks (100), which extend perpendicularly from the weighing base section, and which are arranged on opposite edges (102) of the weighing base section outside the draft shield (12). Also, a draft shield (12) that has such a weighing chamber base (34), and has at least one side panel (26), which can be moved between an open position and a closed position. The side cheeks of the weighing chamber base form a section of the side walls (22) of the draft shield (12).

18 Claims, 11 Drawing Sheets

(56) References Cited

U.S. PATENT DOCUMENTS

2006/0157287 A1\* 7/2006 Leisinger ............. G01G 21/286
    177/180
2009/0194340 A1    8/2009 Mock

FOREIGN PATENT DOCUMENTS

DE    102009055622 A1    5/2011
EP         2088406 A1    8/2009
WO      2005003697 A1    1/2005

\* cited by examiner

WEIGHING CHAMBER BASE AND DRAFT SHIELD FOR A PRECISION BALANCE AS WELL AS A PRECISION BALANCE

CROSS REFERENCE TO RELATED APPLICATIONS

This is a Continuation of International Application PCT/EP2014/002814, which has an international filing date of Oct. 18, 2014, and the disclosure of which is incorporated in its entirety into the present Continuation by reference. The following disclosure is also based on and claims the benefit of and priority under 35 U.S.C. § 119(a) to German Patent Application No. DE 10 2013 113 003.8, filed Nov. 25, 2013, which is also incorporated in its entirety into the present Continuation by reference.

FIELD OF THE INVENTION

The invention relates to a weighing chamber base for a precision balance as well as a draft shield for a precision balance with such a weighing chamber base.

BACKGROUND

It is well known to attach a draft shield to a precision balance, where the draft shield surrounds a space above the weighing dish of the precision balance. The draft shield has the task of preventing the weighing process from being negatively affected by external influences, such as air movements, electrostatic forces of attraction or thermal radiation. In order to be able to place an object to be weighed on the weighing dish, a draft shield of this type has a side panel that can be slid between a closed position and an open position. In order to clean the draft shield or to obtain unimpeded access to the weighing dish, it is known from the prior art that the side panels and a front panel as well as a lid of the draft shield can be totally disassembled. However, in order to thoroughly clean the weighing chamber of the precision balance, it is also desirable to be able to remove the weighing chamber base, in order to make it easy to clean the base. In addition, the weighing chamber base should be designed in such a way that liquids or foreign matter, falling on the weighing chamber base, cannot fall into the weighing process-specific system, which is disposed underneath the weighing chamber base, and cannot damage the weighing process-specific system.

The German patent DE 103 55 106 A1 describes a removable draft shield having walls that are coated with an electrically conductive material and are connected to each other with electrically conductive connections, so that electrostatic charges can be discharged.

The German patent DE 10 2009 055 622 A1 discloses a draft shield having a weighing chamber base that is in thermally conductive connection with a thermoelectric module. This design makes it possible to avoid unwanted air currents in the weighing chamber.

The patent WO 2005/003697 A1 discloses a balance that has a draft shield that is positioned on the balance housing in such a manner that it can be removed.

The German patent DE 198 49 399 A1 discloses a balance with a draft shield that is attached to the balance housing with a locking device.

The European patent EP 2 088 406 A1 discloses a balance with a draft shield that is attached via a form locking connection to the balance housing with the aid of a fastening arrangement.

SUMMARY

It is an object of the present invention is to provide a weighing chamber base for a precision balance that is easy to assemble and to disassemble and that at the same time provides reliable protection for the weighing process-specific system. It is a further object of the invention to provide a draft shield for a precision balance that is easy to disassemble in its entirety without tools and that can be easily removed along with any contaminant and without leaving any residue.

In order to achieve these objects, according to one formulation, the invention provides a weighing chamber base for a draft shield of a precision balance, where the weighing chamber base has a weighing base section and two side cheeks, which are arranged perpendicular on the weighing base section and are arranged on the opposite edges of the weighing balance section. Moreover, the side cheeks are located outside of the draft shield and have fastening devices that are designed as locking elements and that are provided on the mutually facing inner surfaces of the side cheeks.

Therefore, the weighing chamber base is extended laterally beyond the weighing area or, more specifically, the weighing dish or rather projects beyond this weighing dish, preferably as far as up to the side walls of the precision balance. Consequently liquids, which have spilled from the weighing dish onto the weighing base section, cannot flow from this weighing base section to the weighing process-specific system, but rather flow down the side of the housing. In addition, owing to the side cheeks the weighing chamber base can be easily attached to the precision balance, for example, to the side walls, because the side cheeks enclose the side walls from the outside. Since the side cheeks are easily accessible from the outside, a simple detachment is possible. The side cheeks with the locking elements can snap, for example, onto the housing of the precision balance, so that the weighing chamber base is reliably held on the precision balance. Locking elements also offer the advantage that it is possible to disassemble with ease and without a tool by pulling the side cheeks away from the side of the housing of the precision balance, as a result of which the locking elements are released from the housing. The side cheeks are designed in such a way that they enclose a section of the housing, for example, the side walls. In order to be able to detach the weighing chamber base, the side cheeks can be lifted off from the side of the housing, so that the inwards directed fastening devices can be released in a simple manner. In the assembled state the fastening devices are pressed against one another by the side cheeks, so that they are reliably fastened in place.

The weighing base section can have, for example, a passage opening for the weighing process-specific system, which protrudes upwards from a housing section below the weighing chamber base, so that a weighing dish can be mounted on the weighing process-specific system.

In order to prevent liquids or contaminants that are on the weighing base section from being able to pass through the passage opening to the weighing process-specific system, the weighing base section is raised in the region of the passage opening.

Furthermore, the edge of the weighing base section can also be raised at least in sections, in order to prevent liquids or contaminants that have fallen onto the weighing base section from continuing to drip or flow down the precision balance. This design allows the liquids and contaminants to be collected on the weighing base section and allows this weighing base section to be completely removed from the precision balance after the weighing process by lifting off the weighing chamber base without any liquid dripping from the weighing chamber base.

The side cheeks of the weighing chamber base form, for example, at least in sections a side wall of the housing of the precision balance. In addition, it is possible that at least one side cheek has a stop face and/or a guide for a movable side panel. As a result, it is not necessary to provide an additional guide for the side panel on the housing.

The stop face and/or the guide may be formed at least in sections by a surface of the side cheek that is perpendicular to the weighing base section. In a preferred embodiment the entire side cheek may form the stop face and/or the guide. However, it is also possible for the side cheek to have a shoulder or an edge, by which the stop face or the guide is formed.

Preferably the weighing chamber base is made of plastic in one piece, so that it does not have any additional gaps or edges, in or on which liquids can collect.

In order to achieve the objects of the invention, according to a further formulation, a draft shield for a precision balance is provided; and this draft shield comprises an inventive weighing chamber base and at least one side panel, which can be moved between an open position and a closed position, where in this case the side cheeks of the weighing chamber base form a section of the side walls of the draft shield.

The side panel can sit close to a guide or a stop face, which is provided on the side cheek. This design permits the side panels to be disassembled with ease, because they are securely mounted only on the guide rail disposed at the top. As a result, the side panel can be easily pulled out in the upwards direction or can be simply hooked into the guide rail and can be moved with the bottom edge against the stop face or the guide.

The draft shield has, for example, a guide rail for the side panel, with the side panel being mounted with a top edge in the guide rail and with a bottom edge being flush with the weighing chamber base, a guide or a stop face.

In a plan view the stop face or the guide projects preferably beyond the guide rail, so that the side panel is tilted by the force of gravity and the guide rail and is pressed against the stop face or the guide.

According to a further aspect of the invention, a precision balance is provided, which comprises a housing and an inventive weighing chamber base or an inventive draft shield, where in this case the side cheeks of the weighing chamber base form a section of the side walls of the housing. As a result, the weighing chamber base extends across the entire width of the housing and encloses the housing, to some extent, from the outside, so that no liquid can enter into the housing between the weighing chamber base and the housing.

BRIEF DESCRIPTION OF THE DRAWINGS

Other advantages and features will become apparent from the following description in conjunction with the accompanying drawings. The drawings show in.

DETAILED DESCRIPTION

Figure 1:
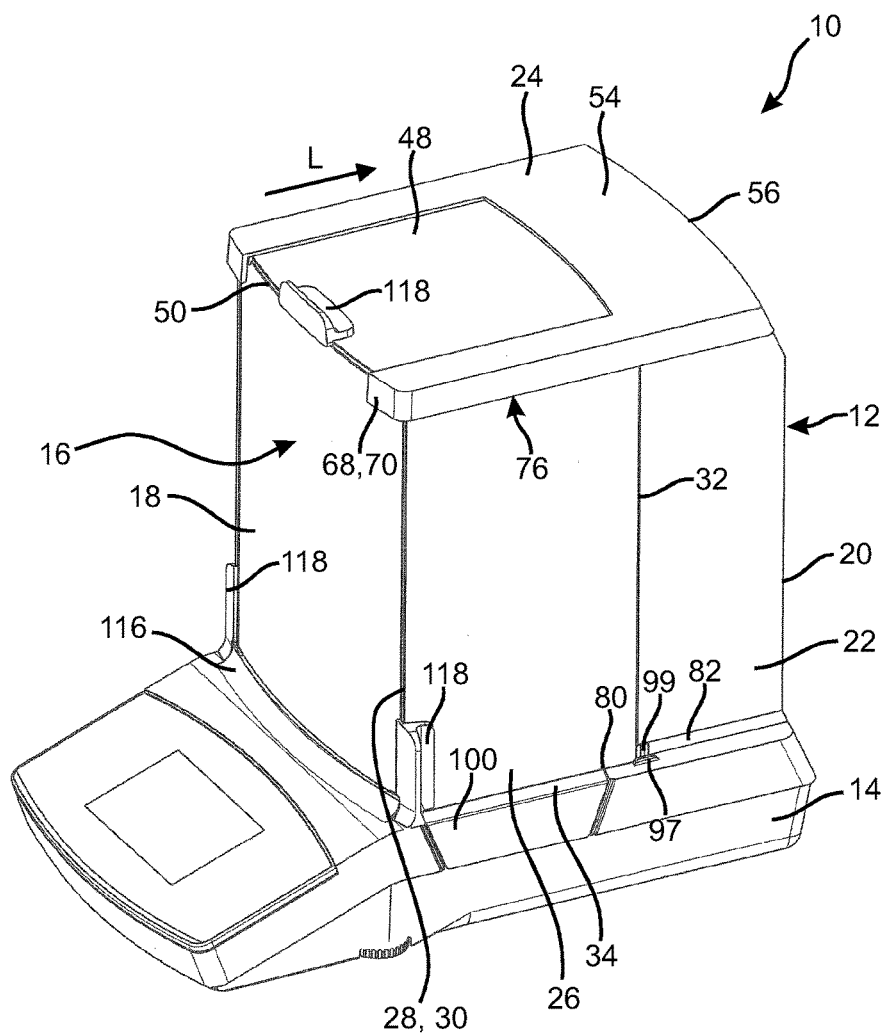
FIG. 1 a perspective view of a balance with a draft shield according to the invention.

FIG. 1 shows a precision balance 10 with a weighing device 14 and a draft shield 12. The draft shield 12 is used to surround a weighing chamber 16 above the weighing device 14 and, in this way, to protect the weighing dish of the weighing device 14 against external influences, such as air movements, electrostatic forces of attraction or even thermal radiation, and, in so doing, to ensure an accurate measurement.

Figure 2:
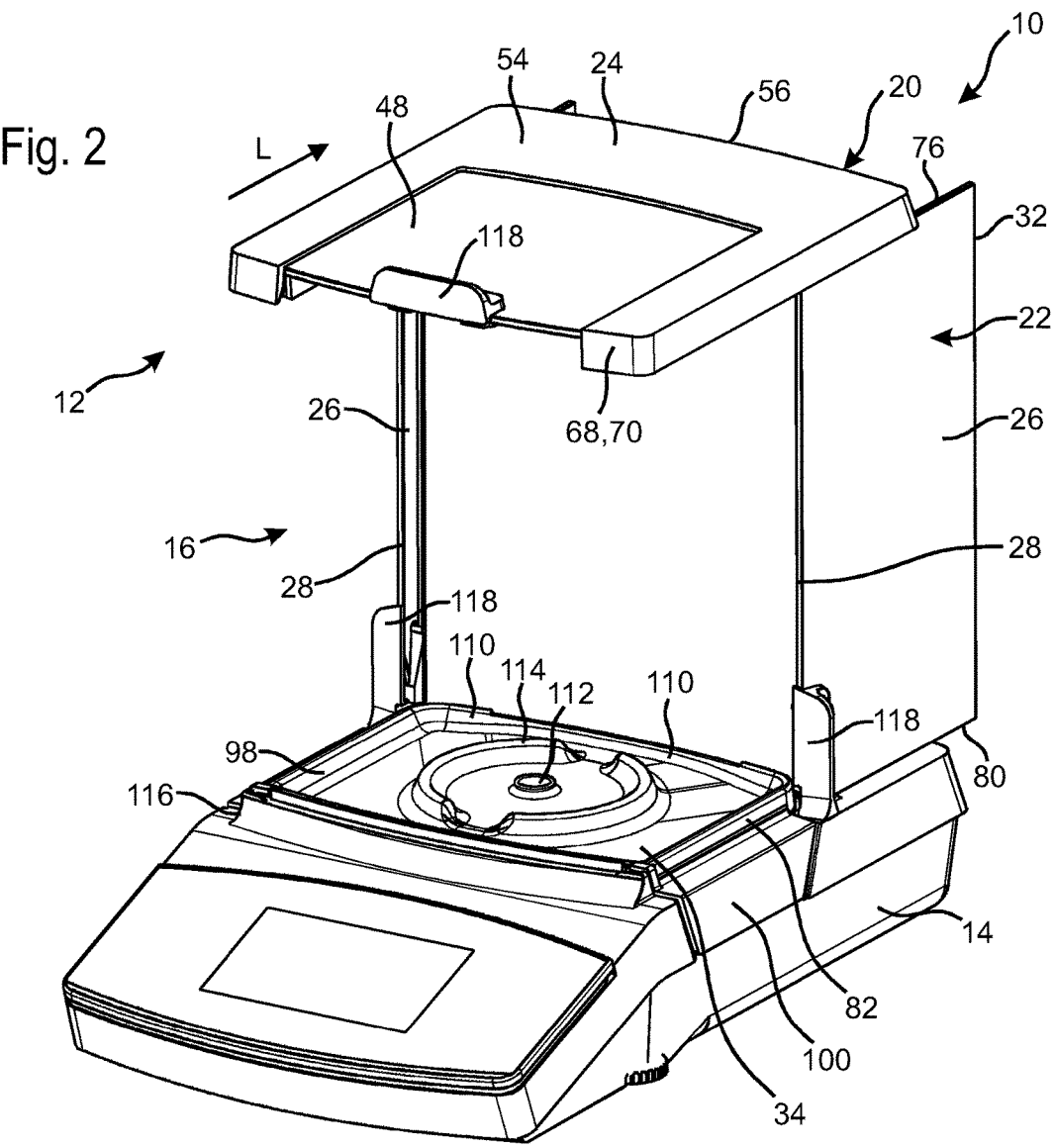
FIG. 2 the balance from FIG. 1 with the side panels in the open position and the front panel removed.

The draft shield 12 has a front panel 18, a rear wall 20 and two opposite side walls 22. Furthermore, a lid 24 is provided that closes off the draft shield 12 towards the top. The rear wall 20 is securely connected to the weighing device 14 and forms a support for the lid 24. Each of the side walls 22 has a side panel 26, which can be moved between a closed and an open position (FIG. 2). The side panels 26 and the front panel 18 extend from the lid 24 to the weighing device 14.

In the closed position shown in FIG. 1, the front edges 28 of the side panels 26 abut the side edges 30 of the front panel 18. The rear edges 32 of the side panels 26 abut the side walls 22. The side walls 22 are tightly connected to the rear wall 20. Since the side panels 26 and the front panel 18 also stop at the lid 24 in the upward direction and at the weighing device 14 in the downward direction, the weighing chamber 16 is completely closed in the closed position of the side panels 26.

In order to be able to clean the draft shield 12 or, more specifically, the precision balance 10 with ease, the side panels 26, the front panel 18, parts of the lid 24 and the weighing chamber base 34 are designed in such a way that they can be detached, as explained below. In particular, all of the parts can be detached without tools.

The detachable components of the draft shield 12 or, more specifically, of the precision balance 10 are explained in the following.

Figure 3:
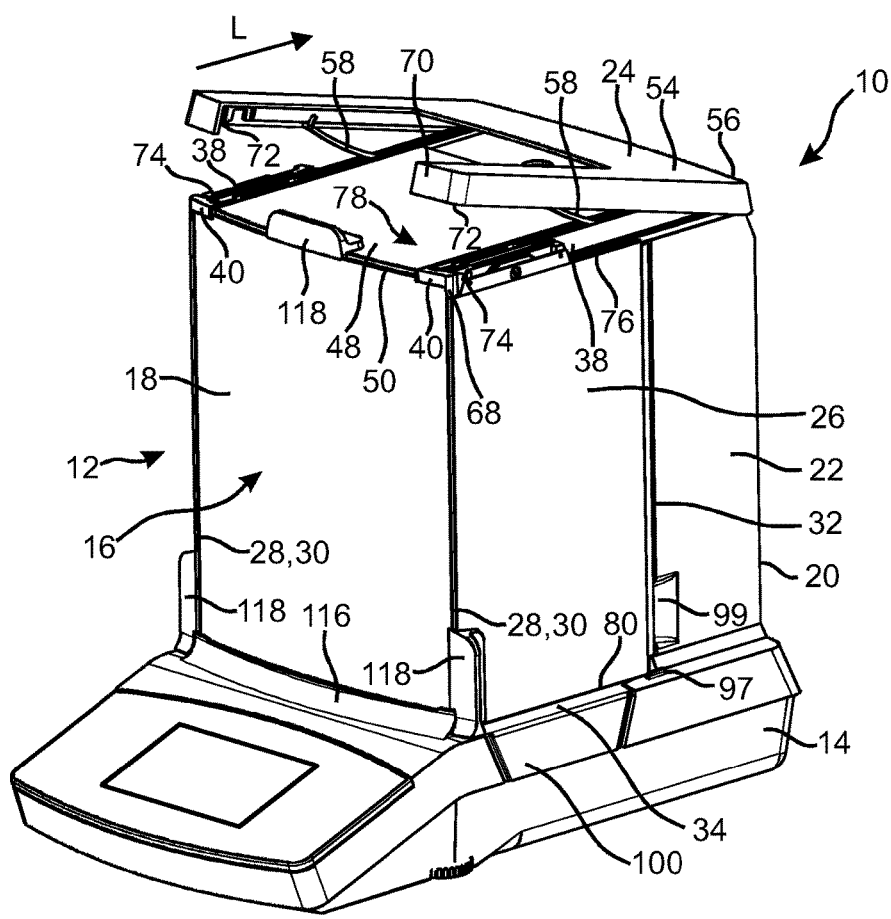
FIG. 3 a perspective view of the balance from FIG. 1 with the lid partially open.
Figure 4:
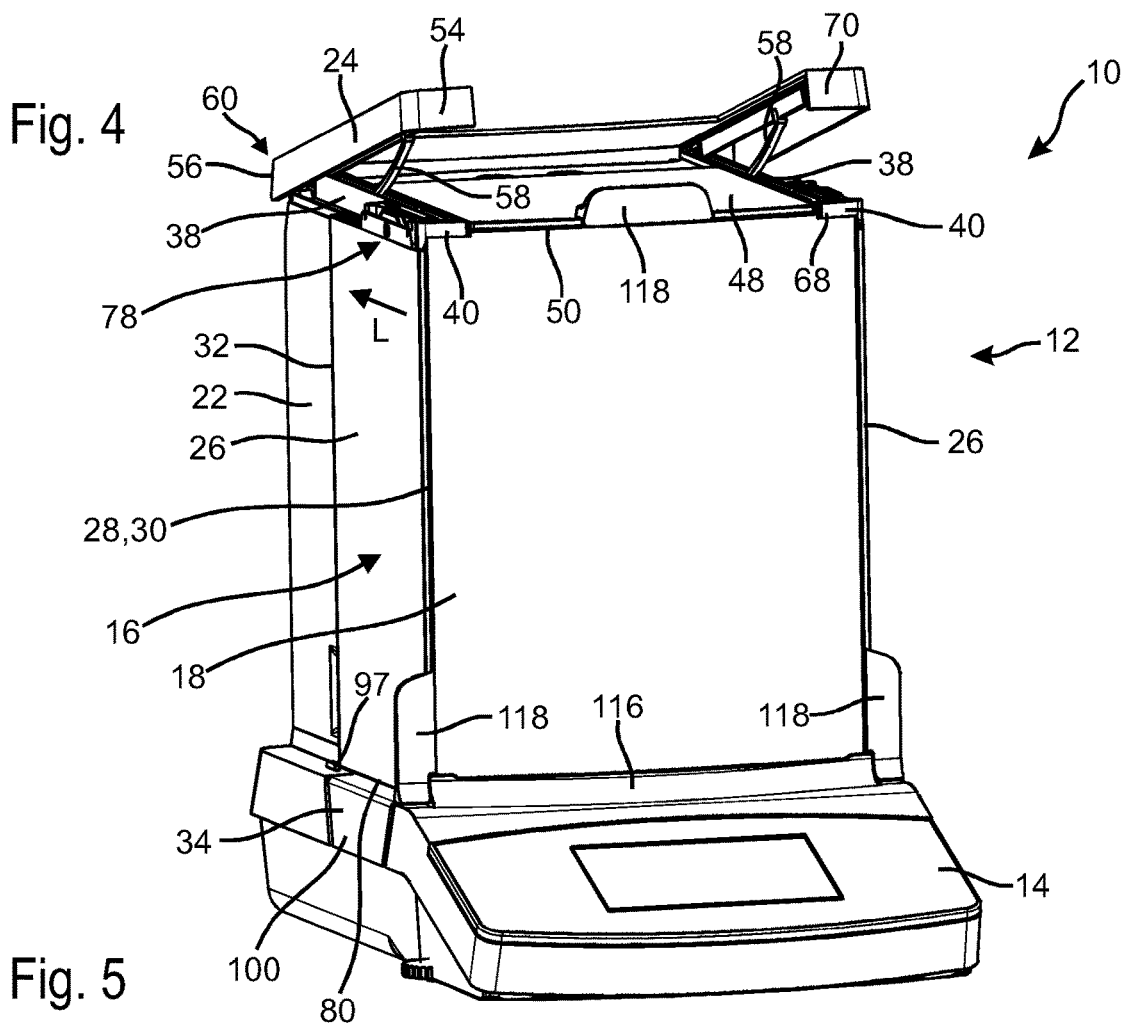
FIG. 4 the draft shield from FIG. 3 from a second perspective.

As can be seen in FIGS. 3 and 4, the lid 24 of the draft shield 12 includes a support frame 36 which is held on the rear wall 20. Provided on this support frame are both the guide rails 38 for the side panels 26 and the holding elements 40 for the front panel 18.

Figure 5:
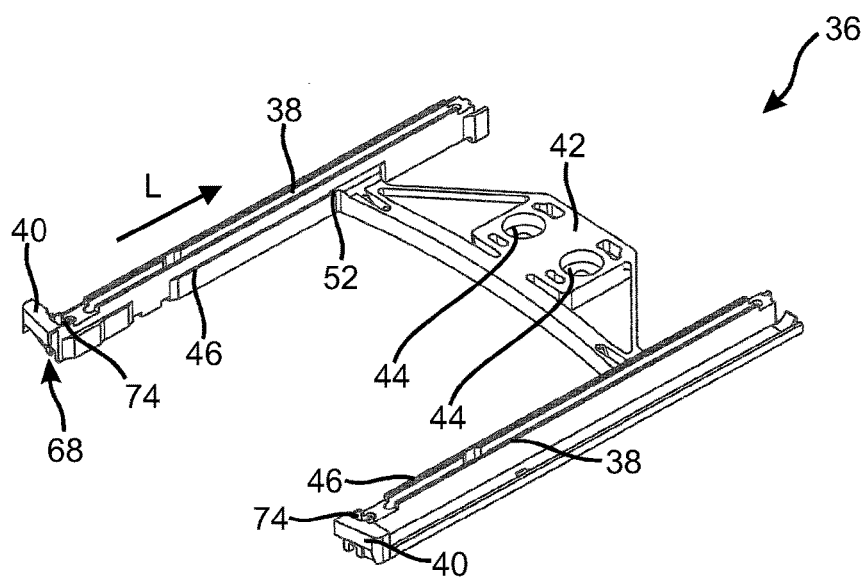
FIG. 5 a perspective view of a support frame of a lid of the draft shield from FIG. 1 with the guide rails of a suspension guide of the invention.

As can be seen in FIG. 5, the holding elements 40 are provided on a front end of the guide rails 38. The two guide rails 38 are connected to each other with a holding geometry 42. Provided at this holding geometry 42 are the mounting holes 44 for mounting the support frame 36 on the rear wall 20.

Furthermore, slide rails 46, which run in the longitudinal direction L of the guide rails 38, are provided on the mutually facing surfaces of the guide rails 38. Mounted on these slide rails 46 is a top cover panel 48 (see FIGS. 3 and 4), which rests in a closed position against the top edge 50 of the front panel 18. In order to provide access to the weighing chamber 16, the top cover panel 48 can be moved on the slide rails 46 in the longitudinal direction L.

The slide rails 46 are made preferably of plastic. The rest of the support frame 36 may be made of metal, for example, aluminum, or also plastic. The top cover panel 48 is made, for example, of glass and has preferably an electrically conductive coating. The plastic slide rails 46 reliably prevent the top cover panel 48 from getting scratched. In order to prevent an electrostatic charging of the top cover panel 48, electric conductors 52, for example, carbon brushes, are provided in the rear region of the slide rails 46 on the support frame 36. These electric conductors rest against the top cover panel 48 and electrically connect it to the support frame 36.

In order to be able to prevent an electric charging of the lid 24, all of the parts of the lid 24 can be designed to be either electrically conductive or coated, so that electric charges can be discharged.

Similarly the front panel 18, the side panels 22 and all of the other parts of the draft shield 12 or, more specifically, the precision balance 10 may be designed to be electrically conductive and/or coated and may be electrically connected to each other, so that an electrostatic charging of the individual parts, in particular, of the panel can be reliably prevented.

Furthermore, the lid 24 includes a cover element 54 which can be pivoted, as explained hereinafter, between a holding position (FIG. 1) and a release position (FIGS. 3 and 4) on an edge 56 of the lid 24, in this embodiment on the rear edge 56. Between the support frame 36 and the cover element 54 there are spring elements 58, which act on the cover element 54 in the release position.

Figure 7:
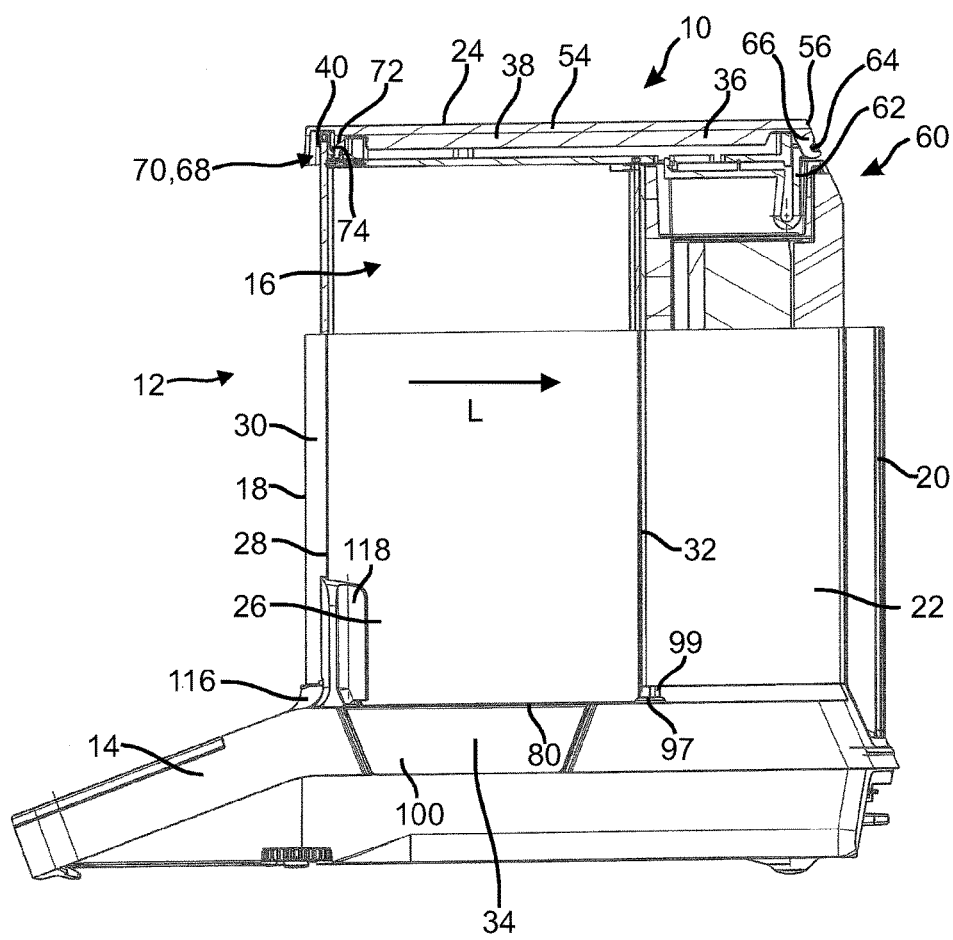
FIG. 7 a side view of the balance from FIG. 1, where the balance is partially cut in the region of the suspension guide and the lid.
Figure 7A:
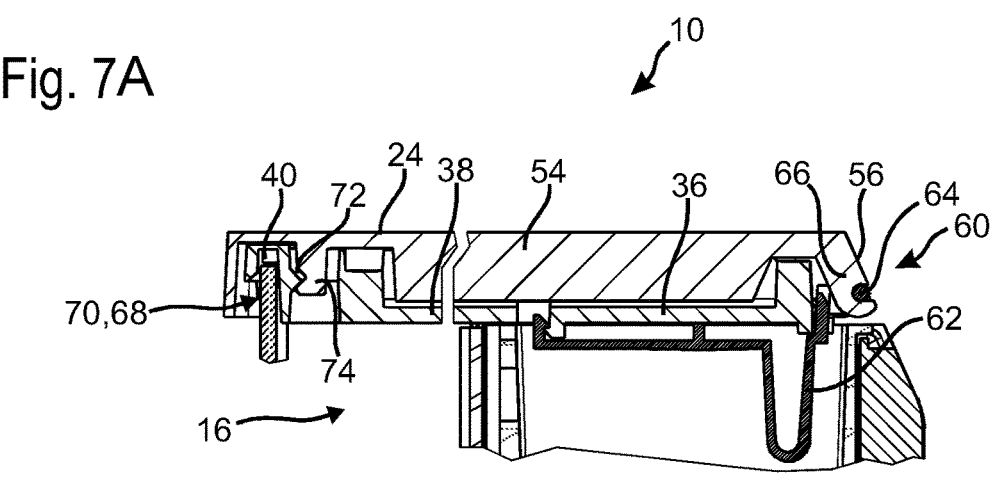
FIG. 7A a partial view of the balance from FIG. 7 in the region of the suspension guide and the lid.

The bearing 60 of the cover element 54 on the support frame 36 is formed by the bearing elements 62, which are provided on the support frame 36. Each of these bearing elements has a bearing pin 64 (see FIGS. 7 and 7A). The bearing elements 62 are designed to be resiliently flexible in the longitudinal direction L. On the cover element 54 there are open bearing hooks 66 in the longitudinal direction L, i.e., towards the rear; and these bearing hooks can engage with the bearing pins 64.

Since the bearing elements 62 are designed to be resilient in the longitudinal direction L, the entire cover element 54 can be moved to a limited extent in the direction of the bearing 60, with the cover element being acted upon by the resiliently flexible bearing elements 62 in the direction of a second edge 68, in this case the front edge 68 of the support frame 36.

In order to hold the lid 24 in the closed holding position (FIG. 7), holding elements 72, 74 are provided on the front edge 70 of the cover element, said front edge being opposite the bearing 60, and on the front edge 68 of the support frame. The holding elements 72, 74 are designed in such a way that they fasten the cover element 54 to the front edge 68 of the support frame 36. The holding members 72, 74 can be released by moving the cover element 54 in the longitudinal direction L in the direction of the bearing 60.

Figure 6:
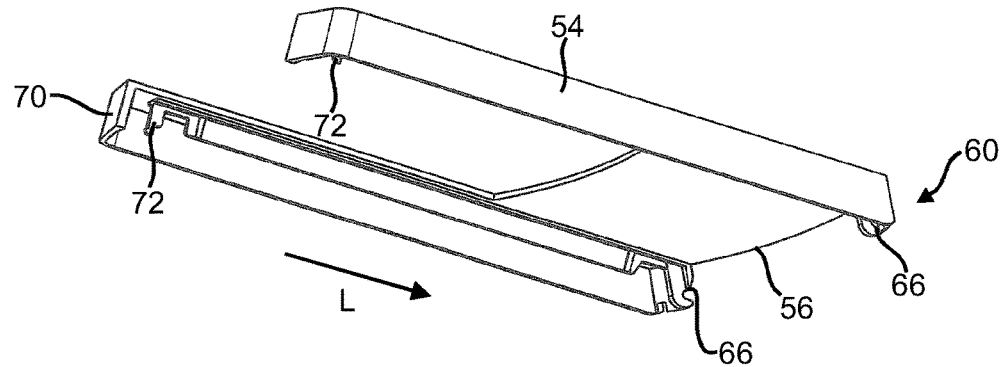
FIG. 6 a perspective view from below of a cover element for a suspension guide of the invention.

As can be seen in FIG. 6, the holding elements 74 on the cover element 54 are formed by locking elements that face away from the bearing hooks 66. The holding elements 72, provided on the support frame 36, are formed by locking receptacles, which are directed in the direction of the bearing 60. If the locking hooks, i.e., the holding elements 74, are moved in the direction of the bearing 60, then they are detached from the holding elements 72, formed by the locking receptacles, so that the cover element 54 can be pivoted about the bearing 60 into the release position.

Thus, the holding elements 72, 74 are released by, for example, applying pressure to the front edge of the cover element 54, by which the cover element is moved towards the bearing 60. Then the cover element 54 is moved by the spring elements 58 into the release position.

Even if no spring elements 58 are provided, it is possible to release the holding elements 72, 74 in a simple way and to move the cover element into the release position. In order to release the holding elements 72, 74, it is necessary to apply pressure to the front edge 70. After releasing the holding elements, only the direction of pressure has to be changed and directed slightly upwards. In the preferred embodiment it is possible to select a direction of pressure that is directed obliquely in the upward direction and in the longitudinal direction L and by which sufficient compressive force for releasing the holding elements 72, 74 is generated; and the cover element 54 is then moved into the release position without changing the direction of pressure. Thus, the cover element can be moved in a fluid motion from the holding position into the release position. A complicated release of the holding elements 72, 74 is not required.

In the release position shown in FIGS. 3 and 4, it is also possible to take the top cover panel 48 out of the support frame 36 without tools by taking the top cover panel out of the slide rails 46 in the upward direction.

Furthermore, in this release position it is also possible to remove the side panels 26 of the draft shield 12 without tools, as explained hereinafter.

Figure 14:
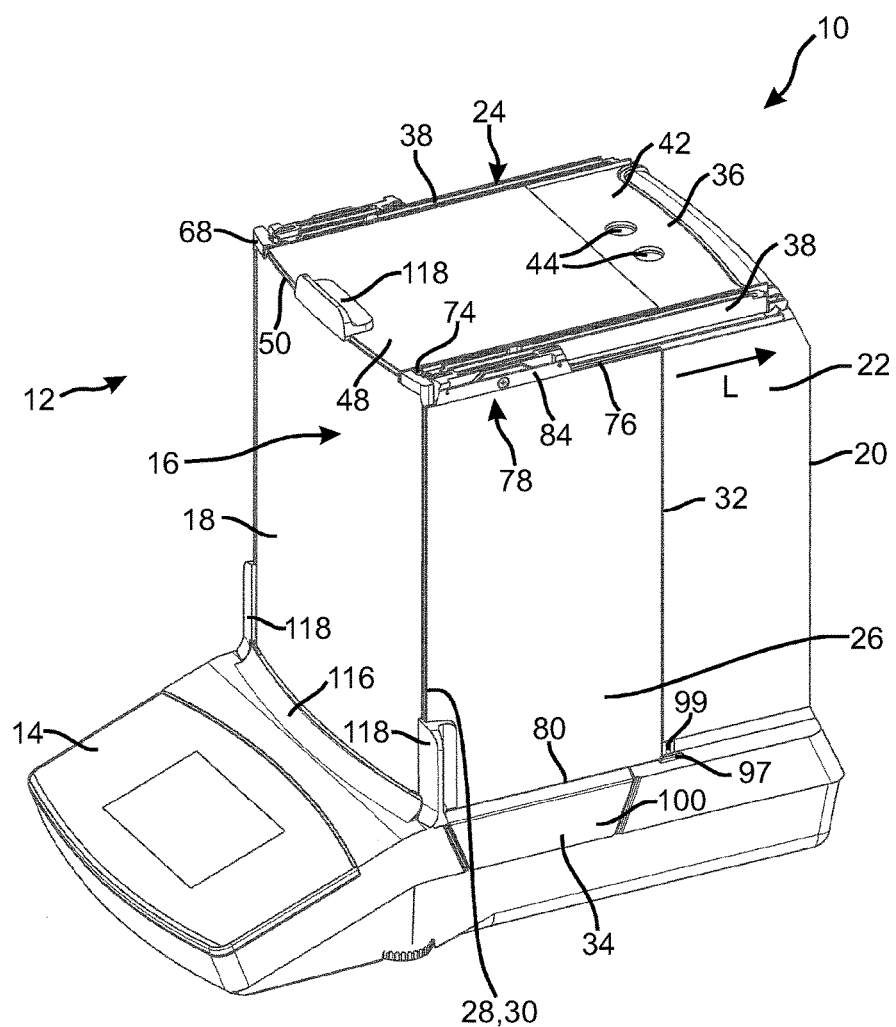
FIG. 14 the balance from FIG. 1 with the cover element removed.

As can be seen in FIG. 14, the cover element 54 may also be completely removed after moving into the release position, so that an easier removal of the top cover panel 48 and the side panels 26 is possible. This removal is possible, because the bearing hooks 66 are designed to be open, so that they can be easily detached from the bearing pins 64. However, in the holding position the bearing hooks 66 are acted upon by the spring bias of the bearing elements 62 against the bearing pins 64, so that a detachment is not possible. The bearing hooks 66 may, for example, also snap on the bearing pins 64, in order to provide an additional safeguard against removal of the cover element 54.

The bearing of the side panels 26 is implemented by a suspension guide 78, which is shown in detail in FIGS. 8 to 12 and which is disposed on the top edge 76 of the side panels 26, and by an abutment surface 82, which is provided on the bottom edge 80 of the side panels 26.

The suspension guides 78 are formed in each instance by a guide rail 38 of the support frame 36 and by a holding device 84, in which the side panel 26 is held.

Figure 8:
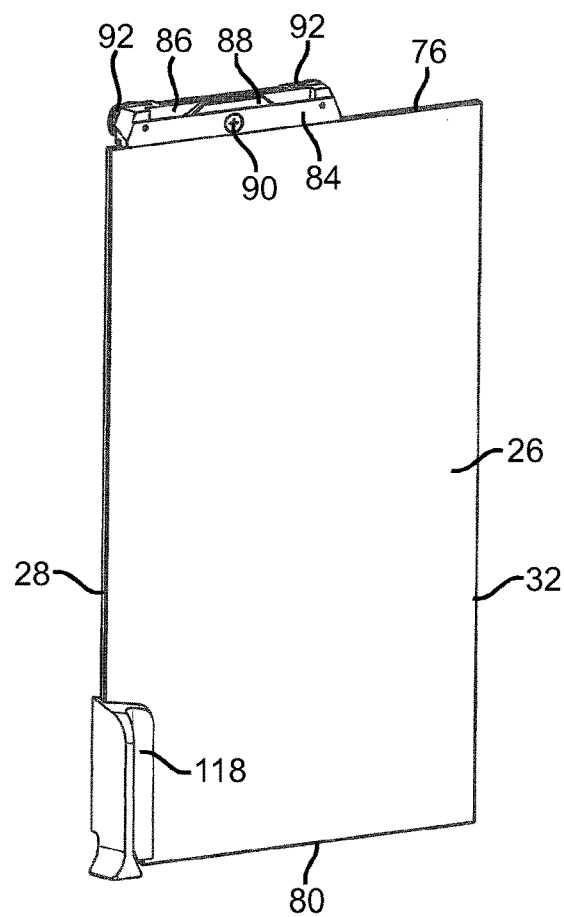
FIG. 8 a perspective view of a side panel of the balance from FIG. 1 with a holding device of a suspension guide of the invention.
Figure 9:
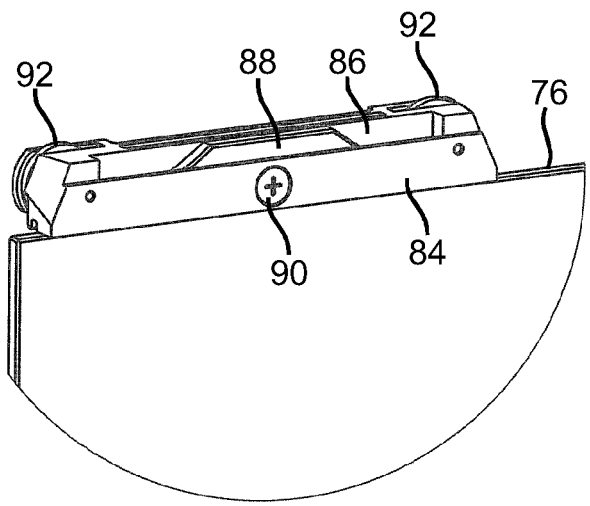
FIG. 9 the holding device from FIG. 8 in a detailed view.
Figure 10:
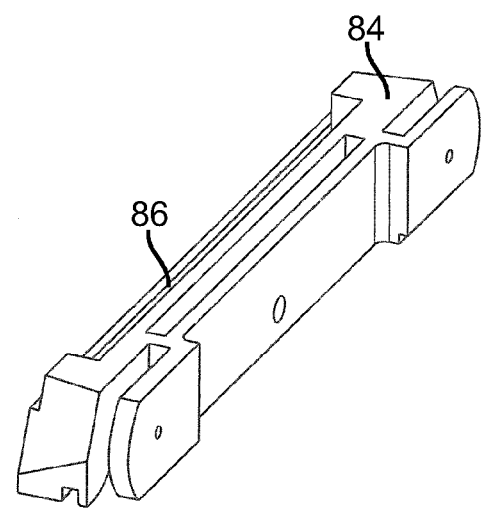
FIG. 10 the holding device from FIG. 8 in a detailed view.
Figure 11:
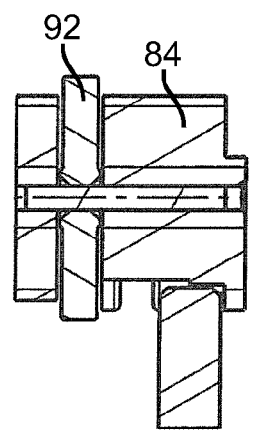
FIG. 11 a sectional view of the holding device from FIG. 8 in the region of a guide element.

As can be seen in FIGS. 8 to 11, the holding device 84 has a receptacle 86 for the side panel 26. The receptacle 86 is formed by a slot, through which a projection 88 of the side panel 26 is guided (FIG. 8). The projection 88 is fastened to the receptacle 86 by a screw 90. The screw 90 can hold the side panel against the receptacle 86 or extend through the side panel.

Furthermore, on the holding device 84 there are guide elements 92, which are formed by rollers and with which the holding device 84 may be mounted such that the holding device can be moved in the guide rails 38 in the longitudinal direction L.

The abutment surface 82 is formed by a lateral border of the weighing chamber base 34, where in this case the abutment surface 82 extends more or less vertically and in the longitudinal direction L.

The guide rails 38 have in each instance an upwardly open groove 94, into which the guide elements 92 can be hooked vertically from above. In the assembled state the subassembly consisting of the holding device 84 and the side panel 26 can be pivoted about the contact line 96 between the guide rails 38 and the guide elements 92.

Figure 12:
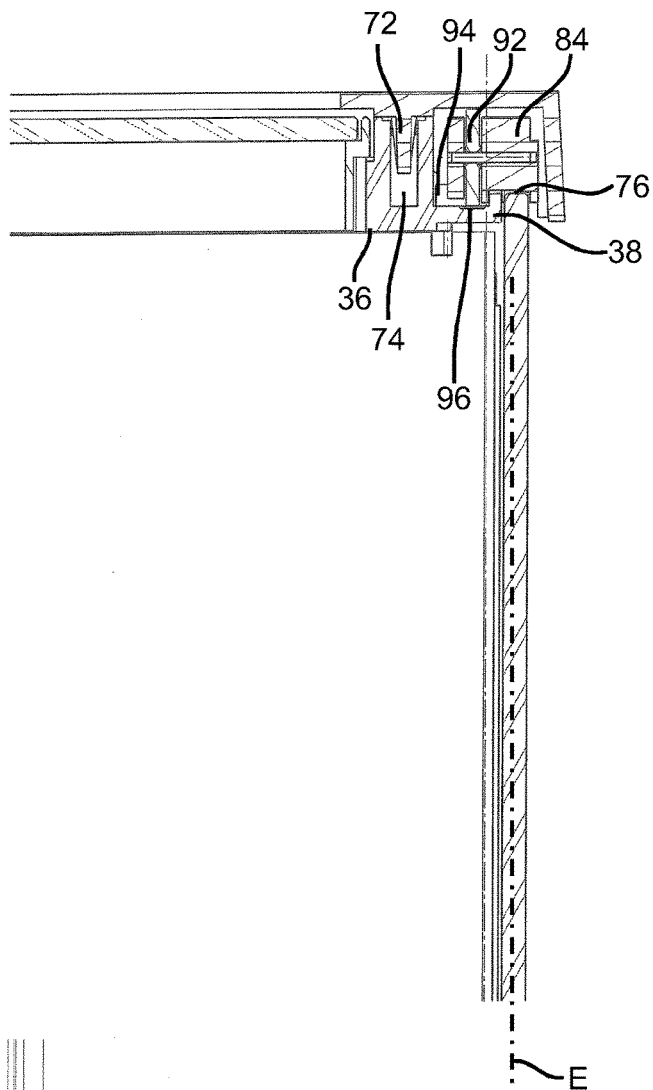
FIG. 12 a sectional view of the draft shield of the balance from FIG. 1 in the region of the side panel.
Figure 13:
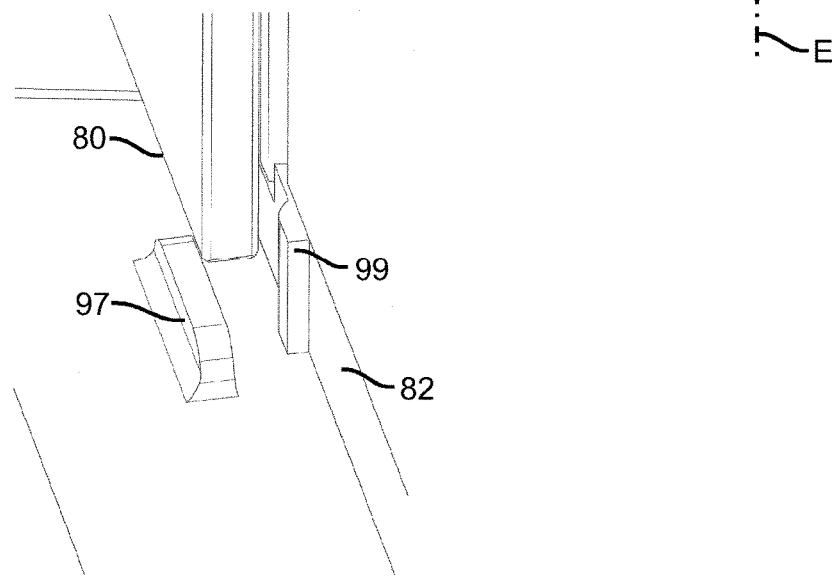
FIG. 13 a detailed view of the abutment surface of the draft shield of the balance from FIG. 1.

As can be seen in FIG. 12, the guide elements 92 are arranged outside the plane E, which is formed by the receptacle 86 and the side panel 26. Therefore, with respect to FIG. 12 the center of gravity of the subassembly, which is formed by the holding device 84 and the side panel 26, is laterally offset from the vertical line by the contact line 96. Therefore, due to gravity this subassembly tries to move the center of gravity below the contact line 96. As a result, the side panel 26 is pressed with the bottom edge 80 against the abutment surface 82, so that the side panel 26 rests tightly against the abutment surface 82.

Since the abutment surface 82 extends in the longitudinal direction L, it is also used as a guide for the bottom edge 80 of the side panel 26. In addition, on the abutment surface 82 there is a guide extension 97, which is used as a safeguard to prevent the bottom edge 80 of the side panel 26 from being lifted off of the abutment surface 82. However, in the normal operating mode of the precision balance 10 or, more specifically, the draft shield 12, this guide extension 97 is not necessary, because the side panel 26 is pressed by gravity against the abutment surface 82.

Furthermore, a detent stop 99 is provided on the side surface 22; and this detent stop holds the side panel 26 in the closed position.

Hence, except for the suspension guide 78, disposed on the top edge 76 of the side panels 26, an additional elaborate bearing arrangement at the bottom edge 80 is not required.

Since the guide rails 38 are formed by upwardly open grooves 94, the side panels 26 can be easily taken out of the guide rails 38 in the vertically upwards direction.

Even the assembly of the side panels 26 is simplified, because they only have to be hooked into the guide rails 38 with the holding devices 84 or, more specifically, the guide elements 92. Due to gravity the bottom edges 80 move by themselves into contact with the abutment surfaces 82. An intricate alignment of the bottom edges 80 or threading into a bottom guide is not required.

In order to prevent the removal of the side panels 26 in the normal operating mode of the draft shield 12, the cover element 54 in the holding position covers the guide rails 38 in the vertically upward direction. As a result, the guide elements 92 cannot be taken out of the guide rails. In order to be able to remove the side panels 26, it is necessary to move the cover element 54 into the release position, in which the guide rails 38 are open in the vertically upward direction.

Independently of the design of the holding device or, more specifically, the guide elements 92, it is only necessary that the guide elements 92 be arranged outside the plane, formed by the side panel 26 and/or the receptacles 86, so that the side panel can tilt against the abutment surface 82 about the contact line 96 between the guide rail 38 and guide element 92.

In order to prevent the plane of the side panels 26 from tilting, it is also possible to provide a plurality of holding devices 84 on a side panel 26.

As can be seen in FIGS. 15 to 18, the abutment surfaces 82 are arranged on the weighing chamber base 34 of the precision balance 10. In addition to the lid 24, the side panels 26 and the front panel 18, the weighing chamber base 34 is also designed to be detachable, so that it can be taken out of the precision balance 10 for cleaning purposes.

To this end, the weighing chamber base 34 has a weighing base section 98 and two side cheeks 100. The side cheeks 100 are located on opposite edges 102 of the weighing base section 98 and are arranged more or less perpendicular to the weighing base section 98 and parallel to each other. In this case the side cheeks are outside of the draft shield.

Fastening devices 106, which are formed by locking elements in this embodiment, may be found on the mutually facing inner surfaces 104. The housing of the weighing device 14 has horizontally extending locking edges 108, with which the fastening devices 106 can engage.

The weighing chamber base 34 is placed vertically from the top on the weighing device 14, where in this case the side cheeks 100 enclose the housing on opposite sides. The weighing chamber base 34 is pushed onto the housing until the fastening devices 106 snap on the locking edges 108. The side cheeks 100 are designed to be resiliently flexible, so that they can give way when pushed onto the locking edges. When the fastening devices 106 are behind the locking edges, the side cheeks 100 are pushed resiliently against the housing, so that the fastening devices 106 snap on the locking edges 108.

Figure 18:
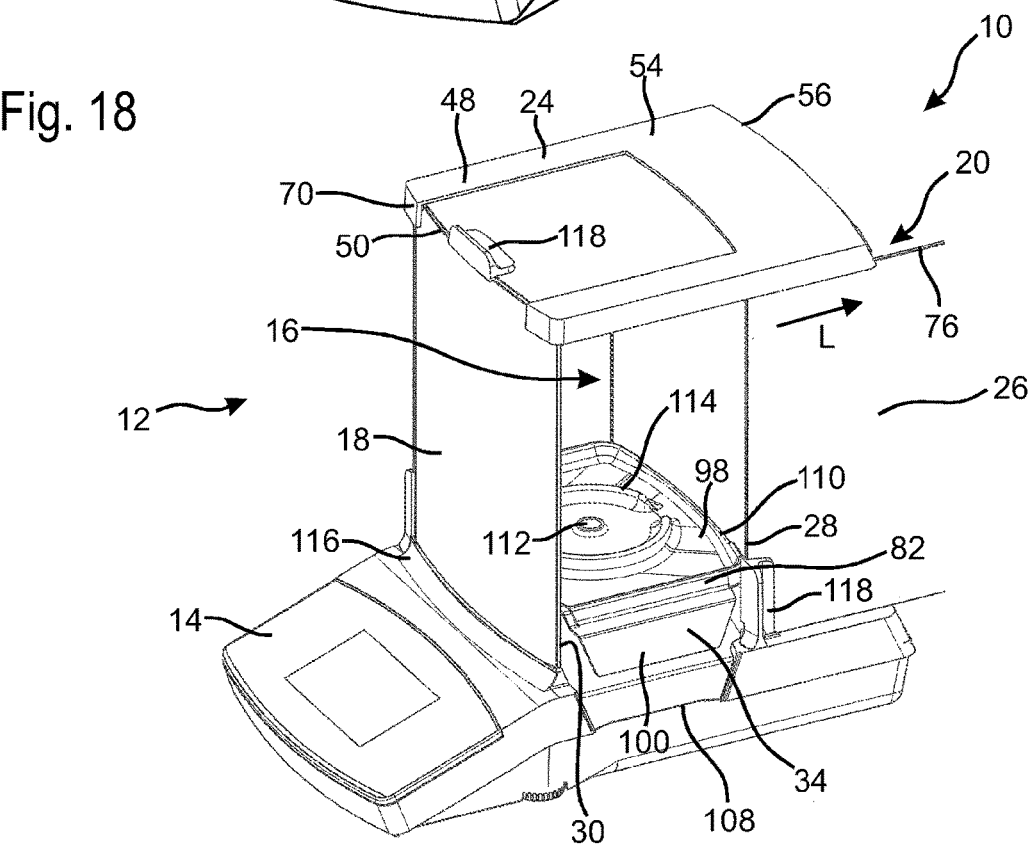

In order to detach the weighing chamber base 34, the side cheeks 100 are laterally pulled away until the fastening devices 106 are released from the locking edges 108. Then the weighing chamber base 34 can be pulled away from the housing in the upward direction (FIG. 18).

Figure 15:
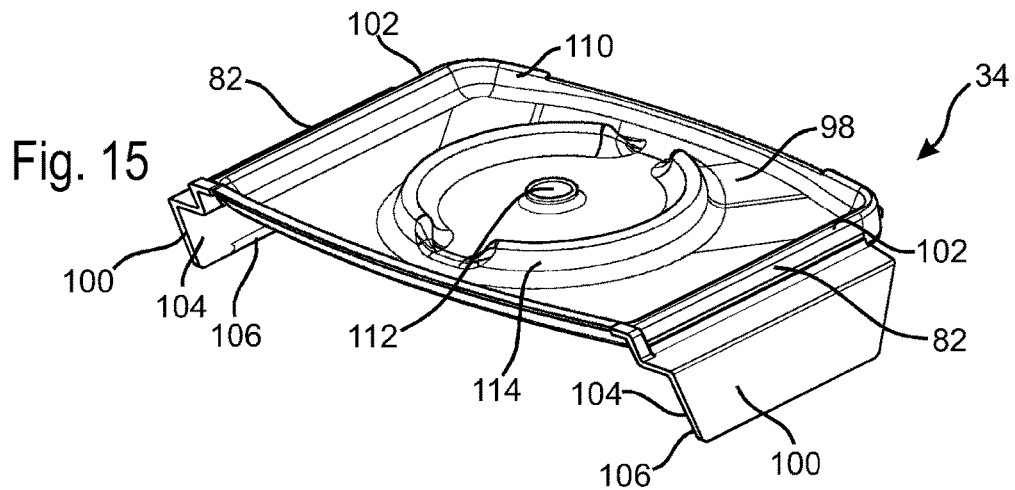
FIG. 15 a perspective view of the weighing chamber base of the precision balance from FIG. 1.
Figure 17:
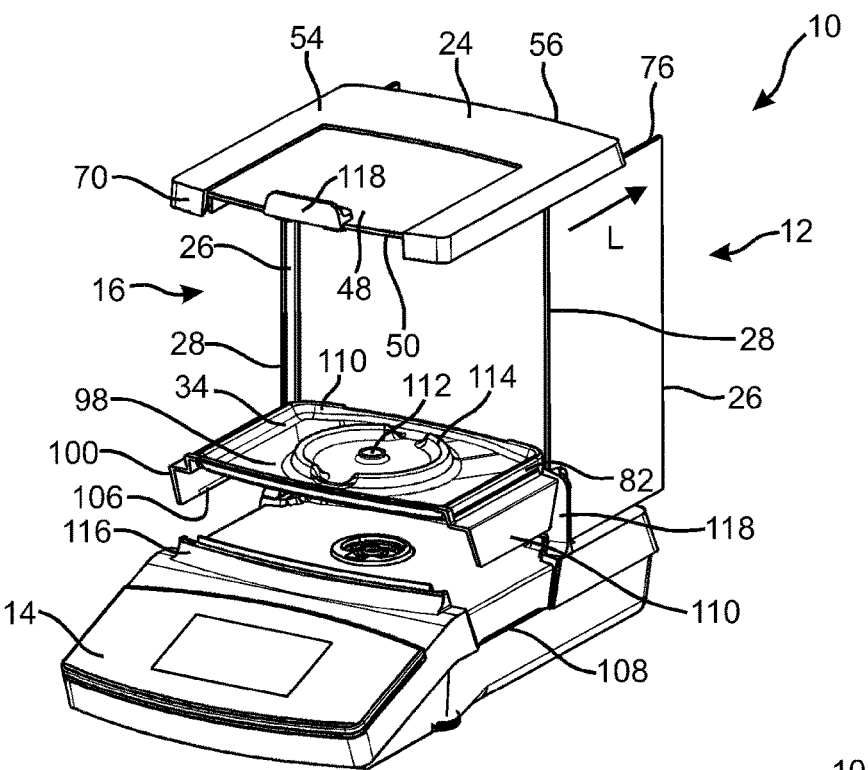
FIG. 17 the precision balance from FIG. 1 with the weighing chamber base partially disassembled, and FIG. 18 a second view of the precision balance from FIG. 17 with the front panel removed.

As can be seen in FIGS. 15 and 17, the abutment surfaces 82 for the side panels 26 are formed in each case by a shoulder that is provided on the side cheeks 100 and on which the guide extension 97 is also provided. Depending on the shape of the housing and the weighing chamber base 34, such a shoulder, however, is not necessary.

The weighing base section 98 is designed more or less flat (FIG. 15), where in this case the circumferential edges 110 are raised relative to the rest of the weighing base section 98. In the center there is a passage opening 112 for a weighing process-specific system that is not shown in detail. Around this passage opening 112 there is also a raised edge 114.

The raised edges 110, 114 prevent the liquids, which have spilled onto the weighing base section 98, from being able to flow out of the weighing chamber base 34 and from being able to flow out, for example, through the passage opening 112 to the weighing process-specific system and, in so doing, contaminating the weighing process-specific system.

Figure 16:
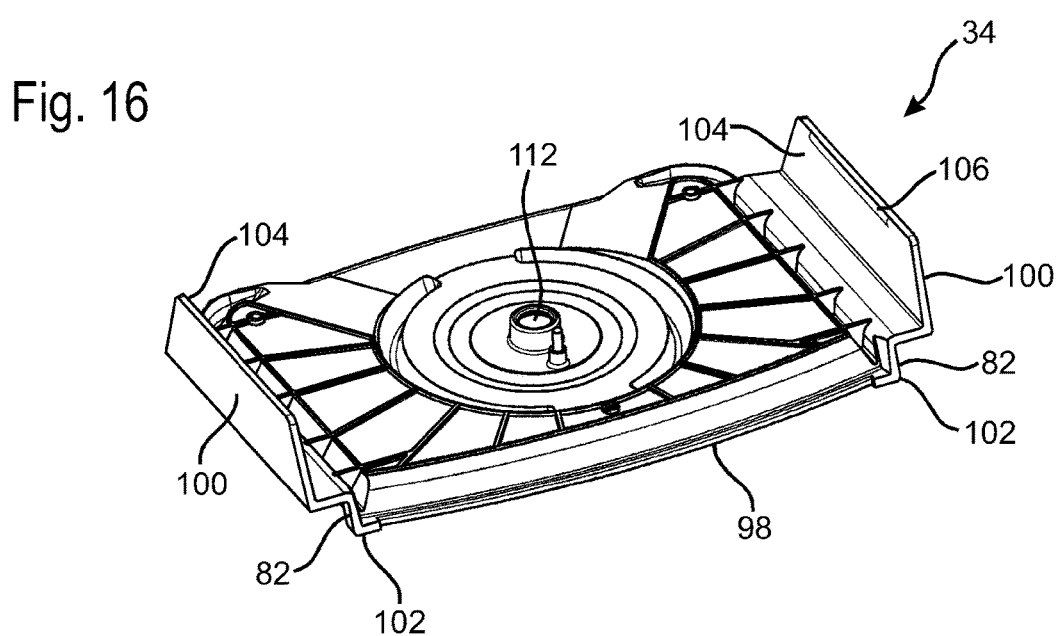
FIG. 16 a rear view of the weighing chamber base from FIG. 15.

As can be seen in FIGS. 16 and 17, the side cheeks 100 of the weighing chamber base 34 form in sections the side walls 22 of the draft shield 12. Since there is no gap between the side walls and the weighing base section 98, liquids or foreign matter that has fallen on the weighing chamber base 34 cannot penetrate into the housing and contaminate the weighing process-specific system.

As can be seen in FIGS. 17 and 18, not only the side panels 26, the lid 24 and the weighing chamber base 34, but also the front panel 18 can be taken out of the holding elements 40 and a holding rail 116. For this purpose the holding elements 40 are designed to be resiliently flexible in the vertical direction to a limited extent, so that they can be lifted upwards, in order to remove the front panel 18.

Thus, almost all of the parts of the draft shield 12 can be disassembled without tools, as a result of which easy cleaning of the draft shield 12 or, more precisely, the precision balance 10 as well as easy access to the weighing chamber 16 are possible.

In order to be able to clean the panels, i.e., the top cover panel 48, the side panel 26 and the front panel 18 with ease, the components, provided on the panels, such as the handles 118 or the holding devices 84, can also be easily disassembled, preferably without tools. In particular, the handles 118 can be easily snapped on the panels, so that it is possible to release this snap lock without tools.

What is claimed is:

1. A weighing chamber base for a draft shield of a precision balance, comprising:
   a weighing base section and
   two side cheeks, which both extend perpendicularly from the weighing base section, which are arranged respectively on opposite edges of the weighing base section, which are located outside of the draft shield, and which are configured as fastening devices for securing the draft shield, and forming respective jaws of a clamp;
   wherein the side cheeks are resiliently flexible towards and away from one another.

2. The weighing chamber base, as claimed in claim 1, wherein the weighing base section comprises a passage opening for a weighing process-specific system.

3. The weighing chamber base, as claimed in claim 2, wherein the weighing base section is raised relative to the weighing chamber base in a region of the passage opening.

4. The weighing chamber base, as claimed in claim 1, wherein an edge of the weighing base section is raised at least in sections of the edge.

5. The weighing chamber base, as claimed in claim 1, further comprising a stop face and/or a guide for a movable side panel on least one of the side cheeks.

6. The weighing chamber base, as claimed in claim 5, wherein the stop face and/or the guide is/are formed by at least sections of a surface of the side cheek that extends perpendicularly to the weighing base section.

7. The weighing chamber base, as claimed in claim 1, wherein the weighing chamber base is made of a unitary piece of plastic.

8. A draft shield for a precision balance comprising:
   a weighing chamber base as claimed in claim 1,
   at least one side panel, configured to move between an open position and a closed position, and
   side walls,
   wherein the side cheeks of the weighing chamber base form a section of the side walls of the draft shield.

9. The draft shield, as claimed in claim 8, wherein the side panel is arranged flush against a guide or a stop face, which is provided on one of the side cheeks.

10. The draft shield, as claimed in claim 8, wherein the draft shield further comprises a guide rail for the side panel, wherein the side panel is mounted with a top edge in the guide rail and with a bottom edge arranged flush against a guide or a stop face of the weighing chamber base.

11. The draft shield, as claimed in claim 10, wherein, in a plan view, the stop face or the guide projects beyond the guide rail.

12. A precision balance, comprising:
   a housing having side walls, and
   a weighing chamber base as claimed in claim 1,
   wherein the side cheeks of the weighing chamber base form a section of the side walls of the housing.

13. A precision balance, comprising:
   a housing having side walls, and
   a draft shield as claimed in claim 8,
   wherein the side cheeks of the weighing chamber base form a section of the side walls of the housing.

14. The weighing chamber base, as claimed in claim 1, wherein the side cheeks comprise mutually facing inner surfaces and wherein the fastening devices comprise projections extending along respective edges, which are distal to the weighing base section, of the inner surfaces of the side cheeks.

15. The precision balance, as claimed in claim 12, further comprising:
   a weighing device removably clamped between the two side cheeks of the weighing chamber base.

16. The precision balance, as claimed in claim 15,
   wherein the side cheeks comprise mutually facing inner surfaces and wherein the fastening devices comprise projections extending along respective edges, which are distal to the weighing base section, of the inner surfaces of the side cheeks, and
   wherein the weighing device comprises locking edges positioned to engage the projections when the weighing chamber base is lowered onto the weighing device into an assembled position.

17. The precision balance, as claimed in claim 13, further comprising:
   a weighing device removably clamped between the two side cheeks of the weighing chamber base.

18. The precision balance, as claimed in claim 17,
   wherein the side cheeks comprise mutually facing inner surfaces and wherein the fastening devices comprise projections extending along respective edges, which are distal to the weighing base section, of the inner surfaces of the side cheeks, and
   wherein the weighing device comprises locking edges positioned to engage the projections when the weighing chamber base is lowered onto the weighing device into an assembled position.

\* \* \* \* \*